(12) United States Patent
De Campos Velho et al.

(10) Patent No.: US 10,529,006 B2
(45) Date of Patent: Jan. 7, 2020

(54) SYSTEM AND METHOD FOR MANAGEMENT AND OPTIMIZATION OF WAITING TIME FOR CHECK-OUT SERVICE BY MEANS OF UNIQUE IDENTIFIER RECOGNITION VIA LOCAL WI-FI NETWORK

(71) Applicants: Lara De Campos Velho, Rio de Janeiro (BR); Paulo Henrique Braga Rezende Da Silva, Rio de Janeiro (BR); Igor Lins E Silva Rezende Da Silva, Rio de Janeiro (BR)

(72) Inventors: Lara De Campos Velho, Rio de Janeiro (BR); Paulo Henrique Braga Rezende Da Silva, Rio de Janeiro (BR); Igor Lins E Silva Rezende Da Silva, Rio de Janeiro (BR)

(*) Notice: Subject to any disclaimer, the term of this patent is extended or adjusted under 35 U.S.C. 154(b) by 18 days.

(21) Appl. No.: 15/586,740

(22) Filed: May 4, 2017

(65) Prior Publication Data
US 2017/0323369 A1 Nov. 9, 2017

(30) Foreign Application Priority Data
May 6, 2016 (BR) .............................. 020160103720

(51) Int. Cl.
| | |
|---|---|
| *G06Q 30/00* | (2012.01) |
| *G06Q 30/06* | (2012.01) |
| *H04L 29/06* | (2006.01) |
| *H04W 12/06* | (2009.01) |
| *H04W 84/12* | (2009.01) |

(52) U.S. Cl.
CPC ....... *G06Q 30/0633* (2013.01); *H04L 63/083* (2013.01); *H04W 12/06* (2013.01); *H04W 84/12* (2013.01)

(58) Field of Classification Search
CPC ................................................. G06Q 30/06–08
USPC ................................................. 705/26.1–27.2
See application file for complete search history.

(56) References Cited

U.S. PATENT DOCUMENTS

2012/0022968 A1* 1/2012 Manku ............... G06Q 30/0613
705/26.41

* cited by examiner

*Primary Examiner* — Ethan D Civan
(74) *Attorney, Agent, or Firm* — Defillo & Associates, Inc.; Evelyn A Defillo

(57) ABSTRACT

System and method for management and optimization of waiting time for check-out service by using an unique identifier recognition via local wi-fi network with the purpose to manage one or several check-out positions (cashiers or counters), optimizing waiting time for check-out service. This system and method is designed to be used by persons, where each individual is identified by the unique physical address identifier (such as the MAC address) of their personal mobile device with Wi-Fi connection. To access the system on the local server, the user must connect to the licensed establishment's exclusive Wi-Fi local network and access the system using a dedicated pre-installed application or URL address, according to the user's choice. It is therefore a system designed to optimize waiting time, where the addition of new users will occur by mobile device (such as smartphones, tablets, iPods, netbooks, notebooks or other similar devices).

2 Claims, 18 Drawing Sheets

SYSTEM AND METHOD FOR MANAGEMENT AND OPTIMIZATION OF WAITING TIME FOR CHECK-OUT SERVICE BY MEANS OF UNIQUE IDENTIFIER RECOGNITION VIA LOCAL WI-FI NETWORK

TECHNICAL SECTOR: INFORMATION TECHNOLOGY

More specifically, the invention relates to a system and a method for managing and optimizing people's waiting time for check-out service by means unique identifier recognition (such as the MAC address) via wireless local area network; with the objective of, among other functions, organizing the flow of people (consumers and customers) awaiting service at check-outs of commercial establishments and service providers, ordering the demand of consumers and customers (users), optimizing user's time, synchronizing the average time of the user's movement to the check-out indicated by the System with the next vacant position (calculated with statistics analysis, considering the average service time of each check-out position), obeying the sequence of position requests allocated in the System, also obeying the criteria of regular clients or persons with special needs, operated by users themselves, within the area of the local wireless network of the establishment or company licensing the System, capable of serving all users' mobile devices within the coverage area of the local network.

Therefore, it is a system and a method that eliminates the traditional waiting queues, which are preferably applied in commercial establishments and service providers where users with mobile devices with a Wi-Fi connection (such as smartphones, tablets, iPods, netbooks, notebooks or other portable devices), connected to the system's local network in the commercial establishment or the service provider, may request check-out service without the assistance of employees and without the issuance of printed passwords.

FIELD OF THE INVENTION

The system for management and optimization of waiting time for check-out service by means of unique identifier recognition via Wi-Fi local network was created to be utilized by users with mobile devices with Internet access, to allow that consumers and customers use their time in a productive way (for example: selecting products that they want to buy in a store while they wait for service for payment at check-out); thus eliminating the traditional waiting lines in places such as: shops, markets, supermarkets, banks, restaurants, nightclubs, concert halls, cinemas, hospitals, public service agencies, schools, airports, among other establishments where, at certain times, demand for check-out service becomes larger than the operational capacity to serve the consumers and customers who want to be served.

STATE OF THE ART

When the demand for a service is larger than the capacity of a system to provide the service, a waiting queue (or several waiting queues) starts to build up; either when a company is a service provider or when a service is related to the sale of products, such as customer service at payment check-out of supermarkets, for example.

A queuing system can be defined as: clients arriving, positioning themselves at a place to request check-out service, waiting for check-out service and leaving the system after being attended; so that other customers awaiting service are also served on a first-come, first-served basis.

The concept of queues is comprehensive, and extends also to industrial and technological processes, among others.

Queuing Theory describes the queuing system as a stochastic process, defined as a collection of random variables, that make waiting time in a queue somewhat incalculable, unpredictable and distressing; besides causing negative sensations to individuals, such as the feeling of loss (waste of time) and social injustice.

Waiting queues (or waiting lines) are among the items that most displease consumers in stores and customers of service providers. Long queues and lengthy waiting times often lead to purchase abdication and to the abandonment of previously selected products, originating significant losses to commercial establishments, causing customer dissatisfaction, stressing business owners, employees and other associates.

Today, solutions available in the market such as printed passwords, totem displays and electronic panels only minimize the anguish of waiting, but they do not eliminate the main problem: queuing, waiting and the time customers and consumers waste waiting for check-out service.

Queue formations also generate operational problems, such as: the agglomeration of people in access places, corridors and passageways; blockage of shelves and product displays near check-out booths where people wait to be attended; among others.

To request check-out service, the approaches currently available are: clients directly address other people (vendors, tellers, attendants, or the like); clients acquire numeric controls or passwords to be served by an attendant; or clients are "called", at a specific time to receive check-out service with information provided on displays or electronic panels arranged on an ambient, with passwords purveyed by attendants, employees or associates.

SUMMARY OF THE SYSTEM AND METHOD

Based on the limitations described in the state of the art and the growing number of people carrying portable mobile apparels, a system and a method for managing and optimizing waiting time for check-out service by means of the unique identifier recognition via Wi-Fi local network was developed, that eliminates traditional queues; to be utilized by users carrying portable mobile devices with a Wi-Fi connection (such as smartphones, tablets, iPods, netbooks, notebooks or other portable devices) connected to the local network where the System is installed.

Users equipped with a mobile device, upon entering the establishment (ambient within the coverage of the System's local network), will have automatic access to the System by means of the unique identifier recognition of their mobile device, and may request check-out service autonomously, without prior approach of attendants, employees or the like, without the obligation to provide personal registration data (name, e-mail, cell phone number, among others) and without acquiring numeric controls or passwords.

This System and Method proposes an autonomous concept in service request, in which users, with information available in their personal mobile devices, are provided with control and convenience, requesting service whenever they wish.

The System and Method can be used in any segment or business that need to provide check-out service to their clients, consumers and customers, such as: shops, markets, supermarkets, banks, restaurants, nightclubs, concert halls, cinemas, hospitals, airports, among others.

Required Characteristics to Use the System

Items needed to use the System: local Wi-Fi network; basic controller hardware containing: CPU (central processing unit), RAM (random-access memory), Storage and Ethernet adapter with Internet; database (to manage the System and store information for statistics); a System security key (validation password); a web page served as HMI (human-machine interface) to operate on mobile devices with older versions of Android and iOS platforms; applications for iOS, Android, Windows Phone platforms and other platforms and systems that already exist or may exist in the future; institutional/corporate website (with institutional information about the System and instructions on its management); and institutional/client version website (with information about the System for end users).

BRIEF DESCRIPTION OF THE FIGURES

Other features of the present invention will be more readily understood from the following detailed description of preferred embodiments, thereof when read in conjunction with the accompanying figures, in which.

DETAILED DESCRIPTION OF THE PREFERRED EMBODIMENTS

In order to describe the functionalities of the System and the Method, the creators adopted in some parts of this description—as an example of operation—its use at a retail supermarket check-out. However, the proposed System and Method can be used in commercial establishments with other configurations (such as: small, medium and large stores, among others), service providers (such as: restaurants, bars, nightclubs, hospitals, doctors' offices, airports, among others) and events (such as: fairs, festivals, congresses, cultural events, sporting events, among others).

When entering an establishment where the System is available through a dedicated Wi-Fi local area network, an user receives a notification on their personal mobile device if he already have the System's application installed; or is guided (by visual communication and/or with the support of trained attendants who will provide information on how to use the System for the first time) to connect to the local Wi-Fi network using the web version; or is directed to download and install the System's application, according to the specific features of the user's mobile device platform (iOS, Android, Windows Phone, among others). There is no need to provide any registration information.

Note: communication and educational material to provide information for first-time users may be necessary, such as: posters, pamphlets, folders, short videos, ambient sound, support staff wearing vests or T-shirts with phrases like "Can I help?", among other pieces.

The System is capable of detecting any user that access the local server, recognizing unique identifier of their respective mobile devices, as soon as they connect to the Wi-Fi LAN installed in the ambient of the business establishment (licensed company), through its appliances.

Note: Users can access the System in two ways: by application (App) pre-installed on their personal mobile device or by the Internet browser of their device.

Figure 1:
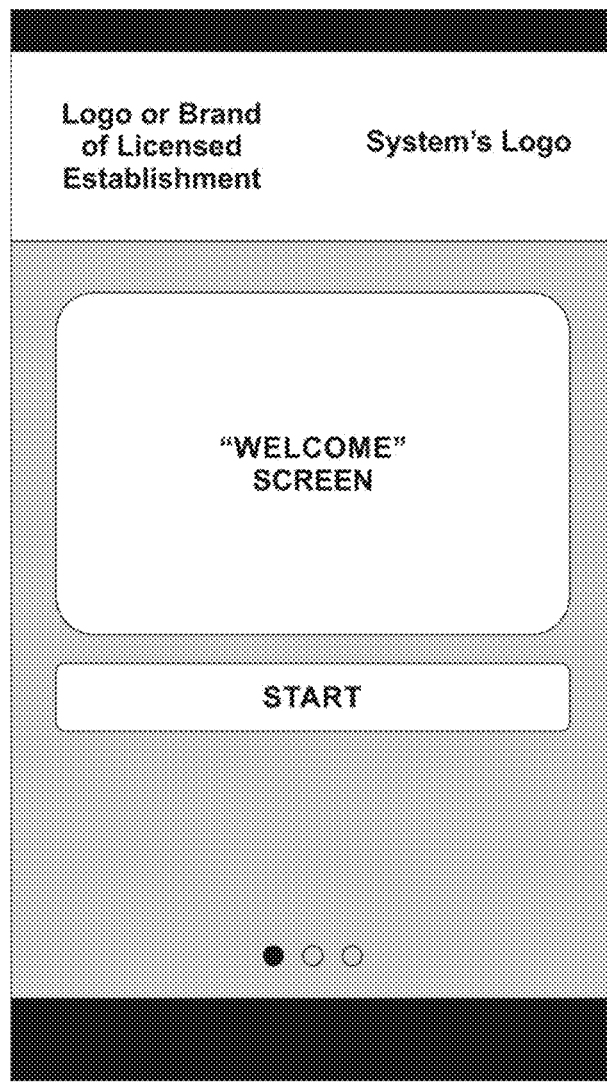
FIG. 1 shows a diagram of the "Welcome" screen of the present invention.

By doing this, the user will be presented to a "Welcome screen" (FIG. 1) introducing the System's features, identifying the establishment where the user is located at that moment.

Figure 2:
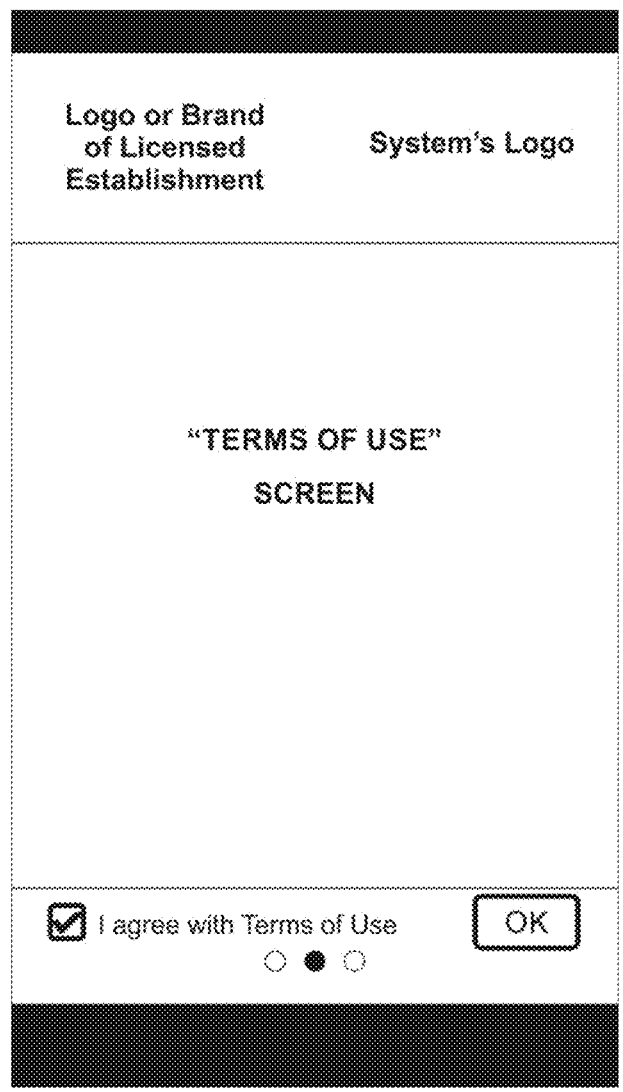
FIG. 2 shows a diagram of the "Terms of Use" and user's agreement ("OK" button) screen of the present invention.

After the introduction, the user must accept the Terms of Use (FIG. 2) to be able to use the System.

Figure 3:
FIG. 3 shows a diagram of the "Establishments where the System is available" screen of the present invention. This screen will only appear when the user tries to access the System in places where it is not available.

Note: If the user opens the application without a dedicated Wi-Fi LAN connection, the user will be informed about the unavailability in that location and will be presented to a list and a map of other establishments where the System is available (FIG. 3).

Figure 4:
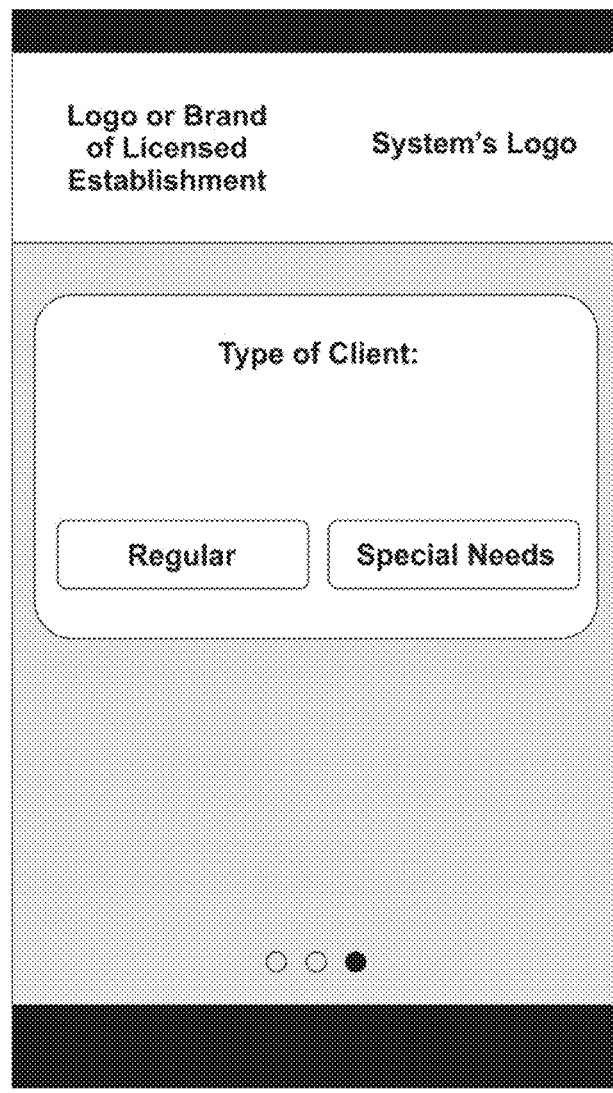
FIG. 4 shows a diagram of the "Type of Client" screen (with options for "Regular" client or "Special Needs" client) of the present invention.
Figure 5:
FIG. 5 shows a diagram of the screen of the present invention in which the information displayed are: advertising banner; name and location of the establishment where the user is; number of people waiting for service at that time; estimated waiting time until service (if user requests a position at that moment); quantity of check-out positions operating with the System; a slider input to inform how many products the user is acquiring; information about the quantity of products ("shopping cart" icon); "Request service" button; "I" button (Information); buttons to select the type of client ("Regular or Special Needs"); and product offers that appear on the mobile device screen randomly.

The user informs the type of client to be served: Regular or Special Needs (FIG. 4) and is directed to the screen with the information regarding the respective type of service and the number of users that are waiting for service at that time (FIG. 5). In this screen, the user is presented with an "i" (Information) button that, when pressed, shows the System's usage instructions. The Information button can be accessed whenever the user has doubts and wishes to know more information about the System and its operation.

Figure 6:
FIG. 6 shows a diagram of the screen with a list of the product offers available at the licensed establishment, that can be accessed by pressing the arrow button at the right bottom side of the screen.

The information displayed on this screen (FIG. 5) are: advertising banner; name and location of the establishment where the user is; number of people waiting for service at that time; estimated waiting time until service (if user requests a position at that moment); quantity of check-out positions operating with the System; a slider input to inform how many products the user is acquiring; information about the quantity of products ("shopping cart" icon); "Request service" button; "I" button (Information); buttons to select the type of client ("Regular or Special Needs"); and product offers that appear on the mobile device screen randomly, that can also be accessed as a list by clicking on the arrow pointing up icon at the bottom of the screen (FIG. 6).

Note: If the user has incorrectly selected the type of client ("Regular or Special Needs") in this screen (FIG. 5), the user can change the selection.

Figure 7:
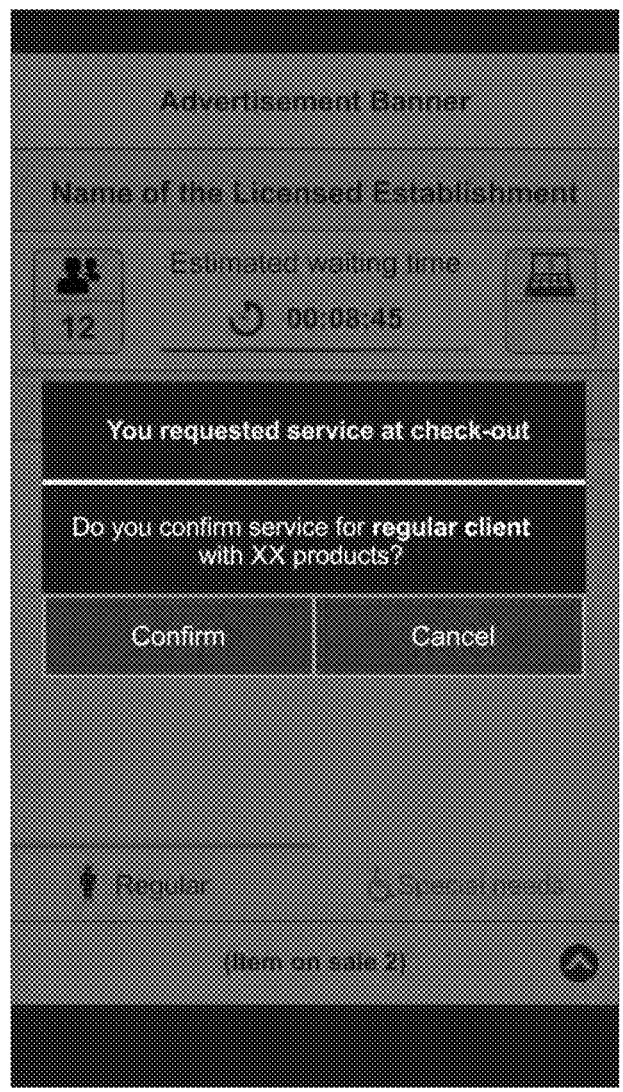
FIG. 7 shows a diagram of the screen where the user is required to confirm or cancel check-out service request and the amount of volumes in user's shopping cart.

To increase the accuracy of estimated waiting time, before requesting check-out service, the user should inform the approximate number of volumes that he or she is acquiring. To do so, the user must select the approximate quantity of items by dragging the slider input (FIG. 5). The System will ask confirmation of the quantity that is being informed by the user (FIG. 7).

Figure 8:
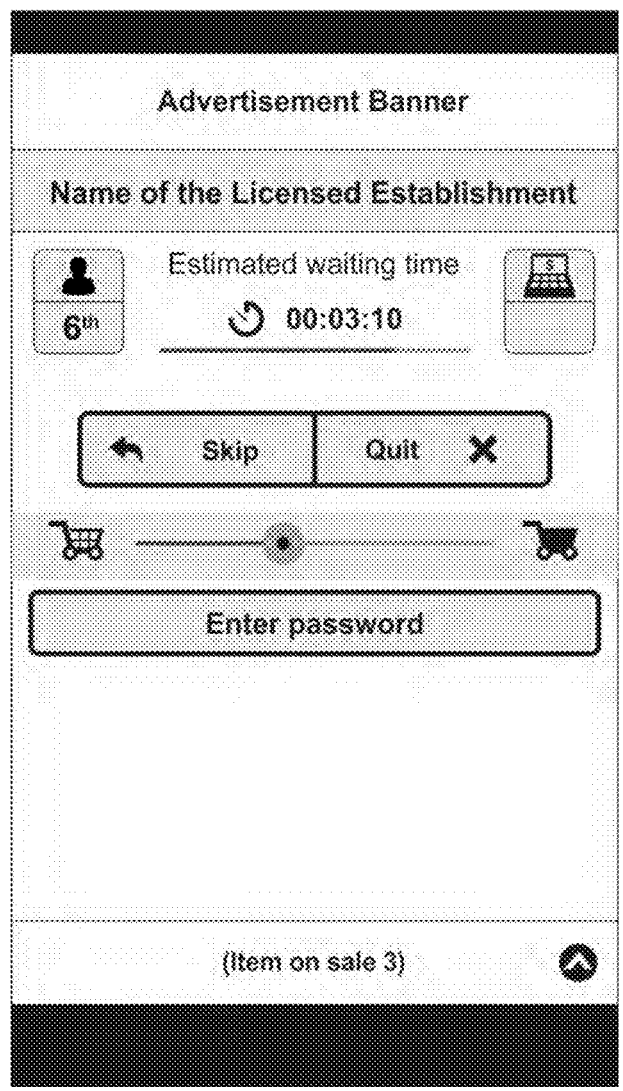
FIG. 8 shows a diagram of the screen that informs: user's position in the System, the estimated waiting time until attendance and the "Quit" or "Skip" buttons.

By requesting check-out service, the user is directed to another screen with the following information: user's position in the System and the estimated waiting time until attendance. In this screen the user can also, at any moment, leave the queue by pressing the "Quit" button or skip position, changing places with the user one position behind, by pressing the "Skip" button (FIG. 8).

Figure 9:
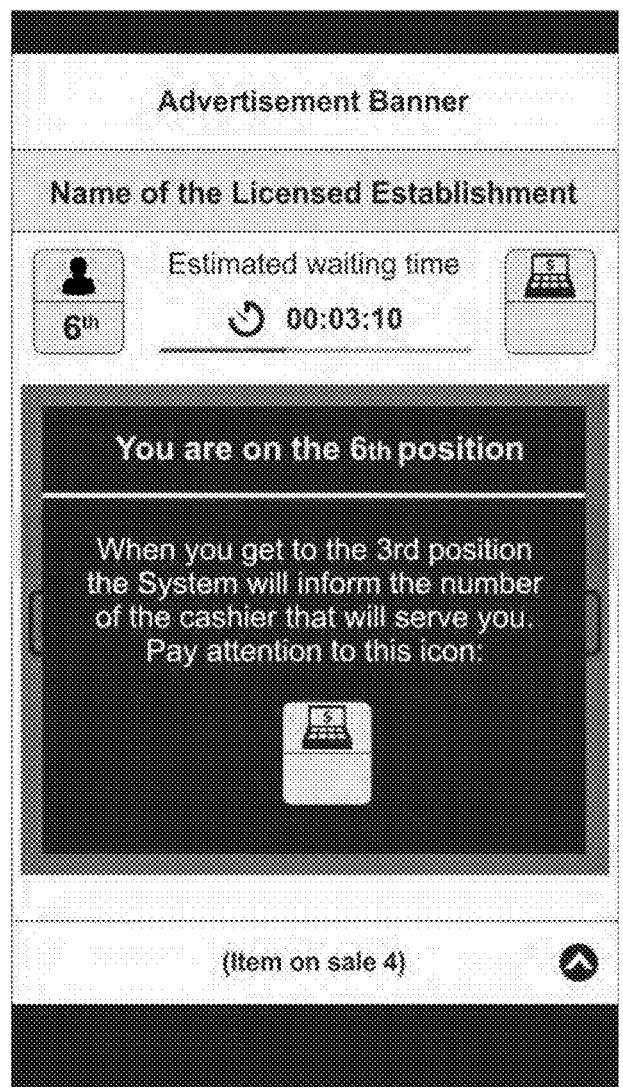
FIG. 9 shows a diagram of the screen where the System sends a confirmation message to the user, confirming check-out service request.

A confirmation message will appear on the screen (FIG. 9) confirming check-out service request, informing the user to wait until the 3rd (third) position for the System to allocate the user to a specific check-out point (cashier or counter) where the user will be attended.

Figure 10:
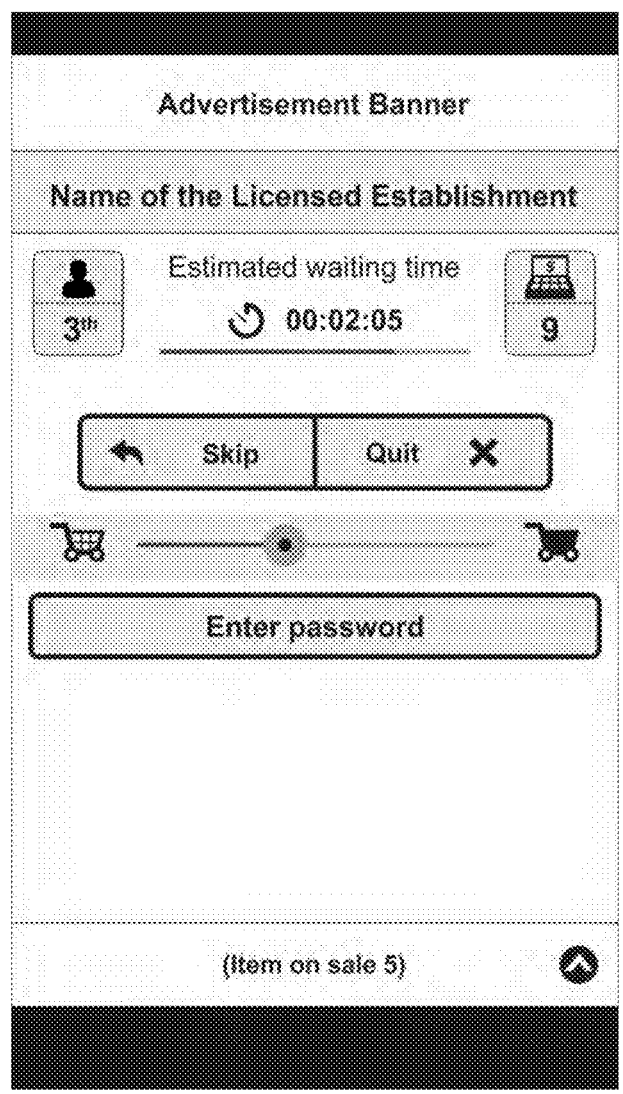
FIG. 10 shows a variation of FIG. 8 where the System informs the user had assumed the 3rd (third) position.
Figure 11:
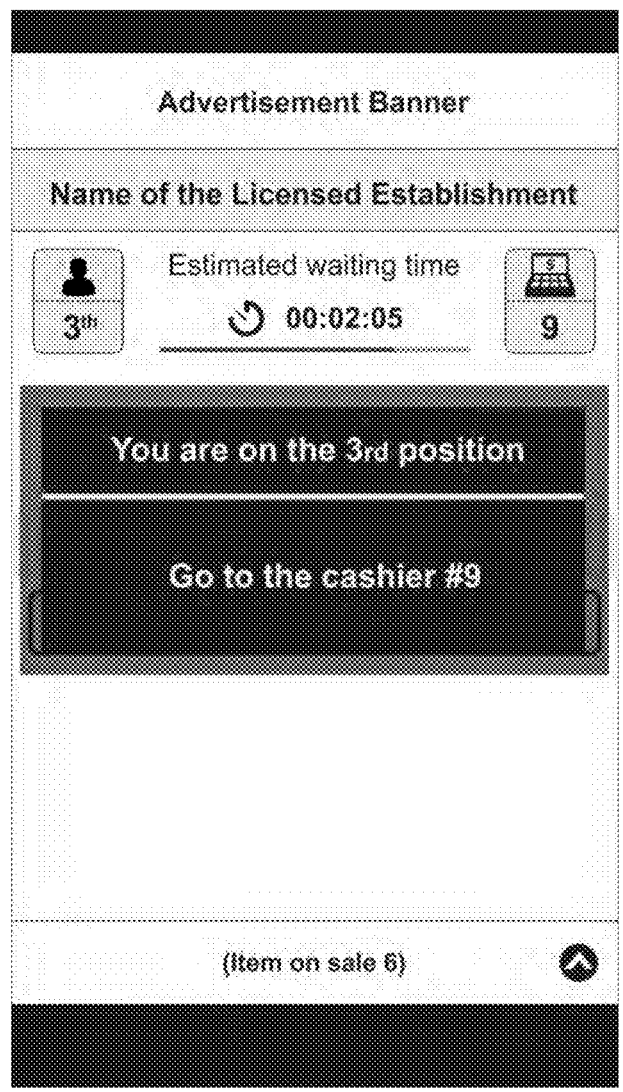
FIG. 11 shows a diagram of the screen where the System informs the user's position and the number of check-out counter that will be serving the user.

Upon assuming the 3rd position (FIG. 10), the user will receive a sound and/or a vibratory and a visual notification (FIG. 11) informing the check-out counter to which he or she should physically be directed to.

If the user decides to purchase more products, he/she can change the amount of volumes to be purchased by dragging the slider input, selecting the estimated quantity of products in the cart. This selection must be made before the user is informed to go to the check-out point; or, as explained before, the 3rd position (FIG. 10).

Figure 12:
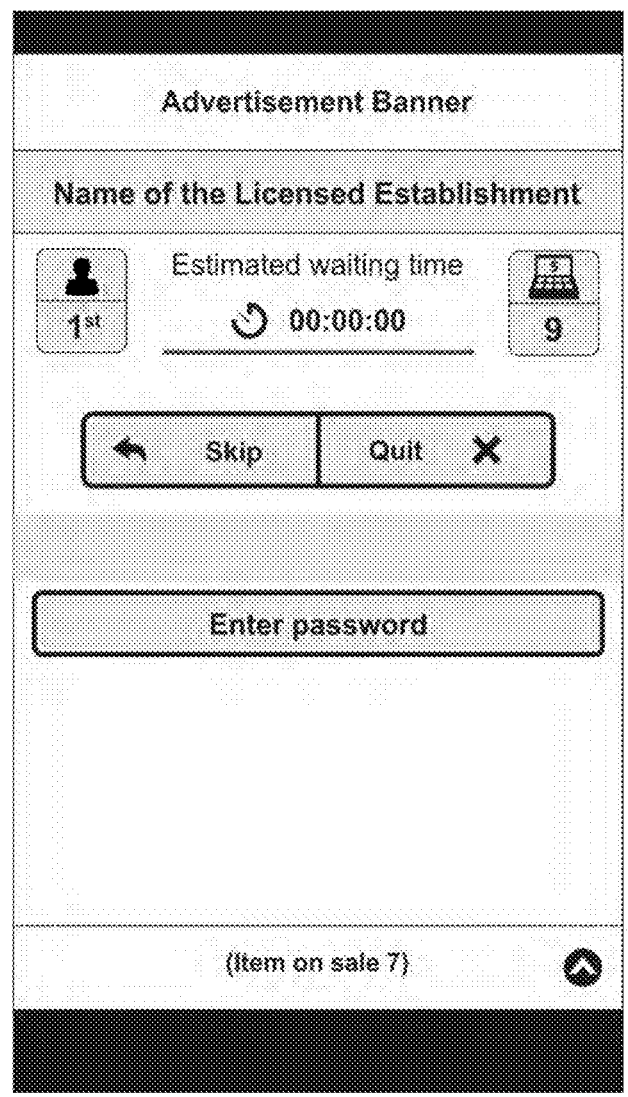
FIG. 12 shows a variation of FIG. 10 where the System informs the user had assumed the 1st (first) position.
Figure 13:
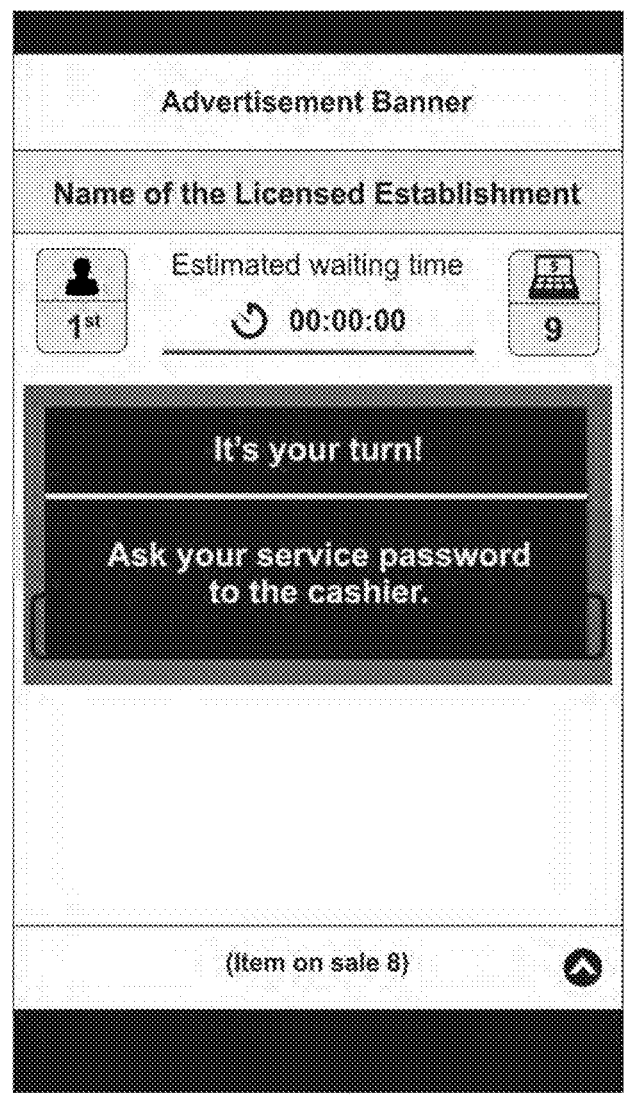
FIG. 13 shows a diagram of the screen where the System informs the user that it's his/her turn to be served and instructs the user to ask the validation service password to the check-out clerk.

Upon reaching the 1st position (FIG. 12), the user will receive a new message (FIG. 13) and will be attended at the check-out counter informed by the System.

Figure 14:
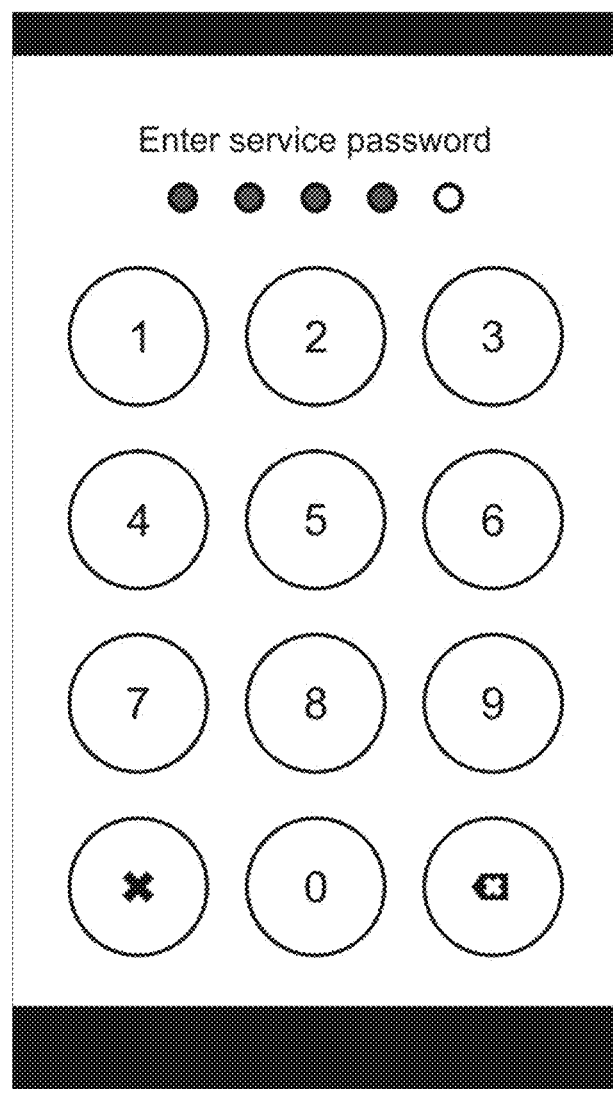
FIG. 14 shows a diagram of the screen with a numeric keypad in which the user or the attendant must enter a password to validate user's service at check-out counter.

A numeric keypad will appear on the screen (FIG. 14), in which the use or the attendant must enter a password to validate user's service at that specific check-out counter. The validation is done by typing and confirming the correct password, provided by the check-out counter clerk.

Figure 15:
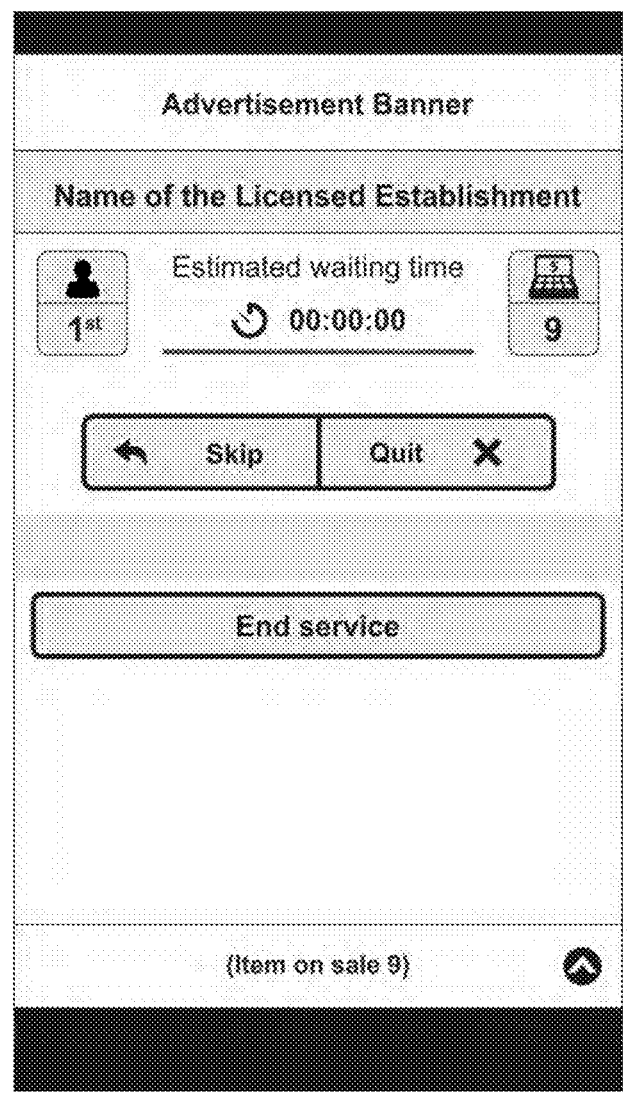
FIG. 15 shows a diagram of the screen where the user is instructed to click the "End Service" button that will appear on screen after the validation of the correct password.

At the end of the checkout process, the user is instructed to click the "End Service" button that will appear on screen after the validation of the correct password (FIG. 15). The "End service" button has the function of removing the user who has already received service from the System and continue to allocate other users who are waiting for check-out service.

Figure 16:
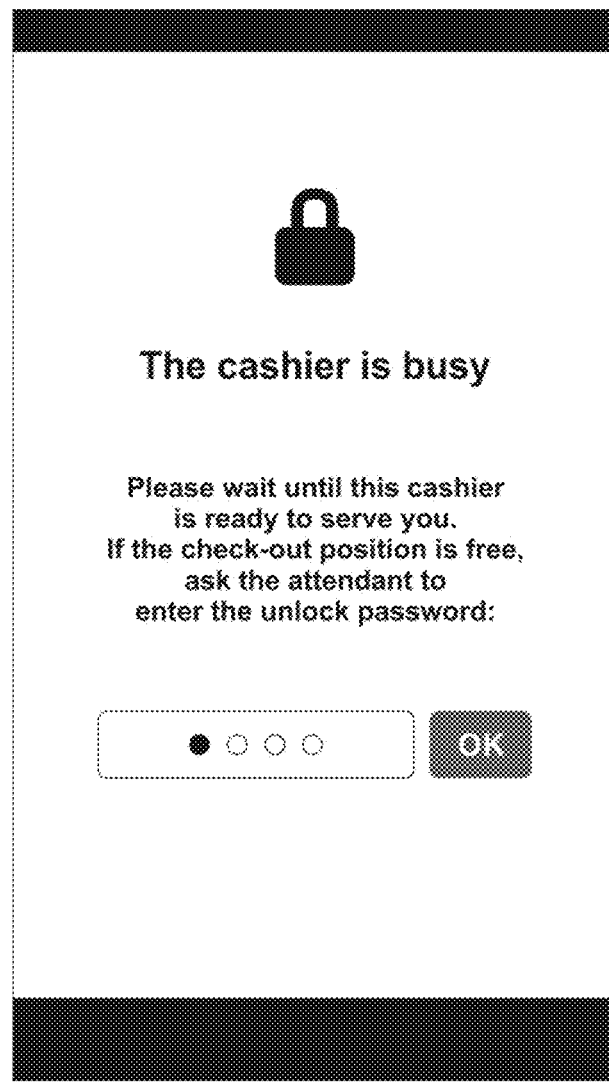
FIG. 16 shows a diagram of the screen where the user receives the message "Enter Password", a specific unlock password that releases that queue position in the System if the System gets locked. This message will only appear if the user who was attended before does not press the "End service" button.

If the user who was attended does not press the "End service" button, the action can be automatically reestablished by the check-out clerk with a specific unlock password that releases that queue position in the System. This password must be entered whenever the next user waiting for check-out service receives the message "Enter Password" (FIG. 16) on their personal mobile device, by presenting the device to the check-out clerk for the unlocking to take place. The System will then return to normal operation.

If the user on the 2nd position or the user on the 3rd position arrives at the checkout point before the user on the 1st position and the check-out booth is empty, one of these users can be attended immediately. For that, the attendant must enter the service password, thus changing the position of the first user that arrived at the booth with the next user in stand-by position.

If a user in the 1st position is skipped from its position 3 (three) times, indicating that the user is absent or unable to receive information on their mobile device, this user will be removed from the System, freeing the position to other users that are waiting for check-out service.

The criterion used by the System to direct customers to the check-out counter are chosen by: the counter with the lowest estimated service time, an appraisal based on the volumes (quantity of items selected by the user for purchase) and the average service time per volume, calculated with the statistical analysis of each check-out counter utilizing the System.

The active positions in the System for each check-out counter are:

1st—User whose service is being initiated.
2nd—User next to check-out point, waiting to be attended.
3rd—Recently called user, moving towards the checkout counter specified by the System.

Figure 17:
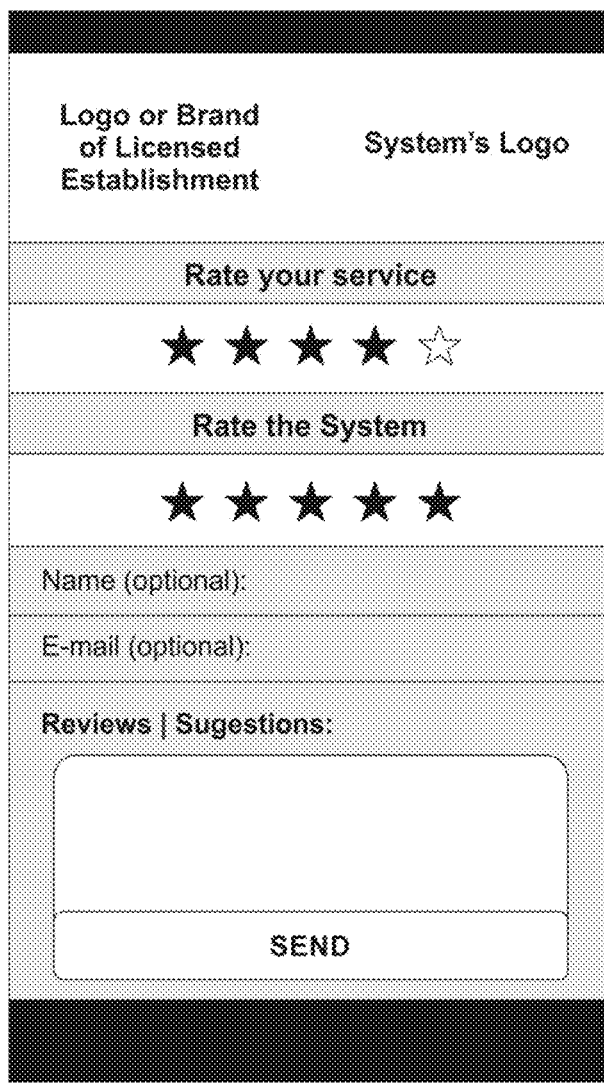
FIG. 17 shows a diagram of the screen where the user can optionally rate the quality of the service of the cashier clerk, the quality of the System, inform his/her name, inform his/her e-mail and send messages with suggestions to the establishment.
Figure 18:
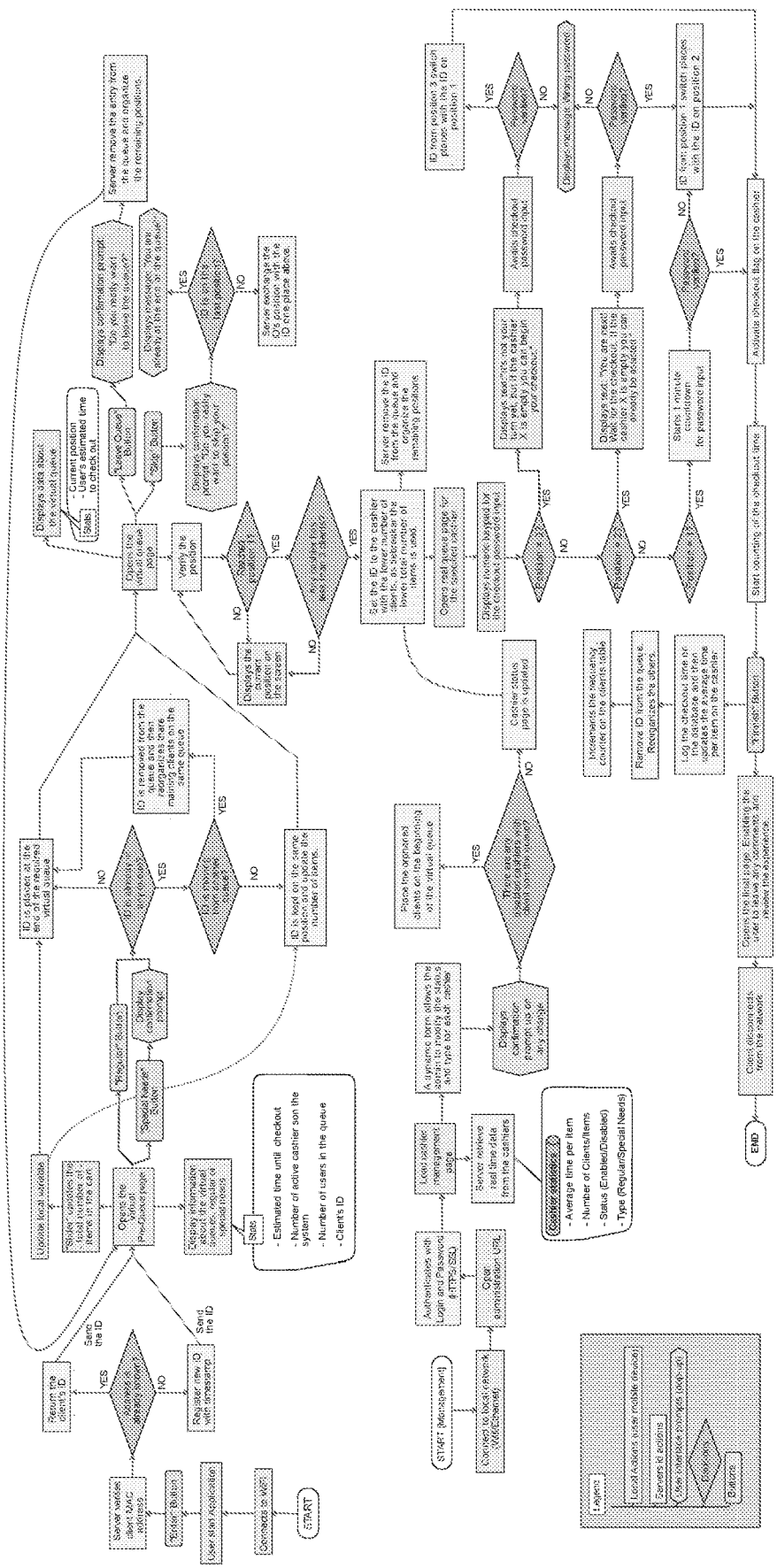
FIG. 18 shows the Flowchart of the System and the Method.

The System also has a screen for evaluation, in which users can review the quality of the service of the cashier clerk, the System and send messages with suggestions to the establishment, if desired (FIG. 17).

The Administrative Environment is a restricted area responsible for the management of the System, to be operated by a clerk, an associate or employee of the licensed company (responsible for the System in loco), using a computer (desktop or notebook) and/or a mobile device (tablet, smartphone, among others).

Administrative Environment features: restricted access via login and password; registration of check-out counters where the System will be available; enabling and canceling the operation of check-out counters; temporary blocking of service of certain check-out counters (if an employee or associate needs to be temporarily absent, as for example: at meal times, a break to use the restroom or need of medical attention); insertion of texts of offers and promotions made available by the establishment; visualization of statistical data of the clerk's service performance as: quantity of services, time dedicated to each client, among others; other information such as: users reviews regarding the service of check-out operators; insertion of instant promotions; statistical data analysis; configuration of the number of check-out counters and the identification of the counters authorized to use the System.

Note: These functionalities must be executed with a computer (desktop or notebook) or mobile device (smartphone, tablet, among others) with access to the Administrative Environment, which will serve as a System Management Terminal.

By selecting, for example, to lock one or more check-out counters in operation, the distribution of waiting users will be reconfigured automatically, disregarding blocked positions, forwarding users on hold to other operant check-out counters.

The Administrative Environment also allows to configure which check-out counters will operate with Regular or Special Needs service. For this, the person responsible for the management of the Administrative Environment must define the number of check-out counters that will be using the System and the type of service desired for each active position.

Note: The establishment must always keep some check-out counters operating in the traditional way (traditional waiting queues) to be used by customers who do not possess a mobile device or those who do not wish to use the System.
Required Infrastructure Management Software: For the operation of the System, a dedicated software must be used, such as "SOTEPAC—Sistema de Otimização do Tempo de Espera para Atendimento em Check-Out" (System for optimization of waiting time for check-out service) Program, registered in Brazil at INPI (Instituto Nacional de Propriedade Industrial) under Process Number: BR 51 2016 000110-0; or other programs that perform similar functions, necessary for the operation of the System.

WLAN (Wireless Local Area Network): A local area network is required for the operation of the system.

The System allows customers to be free to select the products they wish to acquire without having to wait in queues for check-out service.

Choosing to use WLAN allows the System to work properly even if the user does not have a telephone line, a mobile or Internet service available on his/her personal mobile device.

The use of WLAN also has the purpose of keeping the customers within the licensed company surroundings (i.e.: within the reach of the Wi-Fi signal), avoiding the evasion of users searching for other establishments or service providers.

System Server: responsible for hosting the management software, which may be a conventional computer (desktop or notebook) or a basic controller, as described in paragraph [016] of this patent request.

Note: The server must connect regularly to the Internet of the establishment for authentication, software licensing (security key validation) and any other routine system updates.

Wi-Fi access points: Wi-Fi signal access points (and replicators) strategically installed within the licensed company's surroundings, according to the extent of the physical area and the variation of the signal level, to allow uninterrupted connection of user's mobile devices as they move around the establishment.

Switch: Access points connect to the server through a standard network connection and distribution device (switch).

Each access point can establish a subnet. As users will be identified by the media the access control address (MAC Address) of their mobile devices, users can move around the establishment as the unique identifiers of their mobile devices will be automatically moved between one network and another, maintaining continuous and uninterrupted access to the System.

Mobile Device: The System is multiplatform and depends on an application or browser navigation and can be used by any operating system with access to WLAN, such as: iOS, Android, Windows Phone, among others.

Management Terminal: the hardware (desktop computer or notebook, tablet or smartphone) from where the Administrative Environment will be accessed.

Remote Access: allows preventive and corrective maintenance of the System at a distance, as well as routine updates and validation of the licensing performed by periodic verification of the security key (password).

Remote access also allows the management of advertisements and other marketing and publicity actions, and can be managed and monitored by the person responsible for the operation of the System, by the establishment management or directly by a company responsible for the advertisements (such as a digital advertising agency), an ad sales team, among others.

The invention claimed is:

1. A system for management and optimization of waiting time for check-out services, the system comprising:
   a local wi-fi area network dedicated to a specific company;
   a personal mobile device for a user, the personal mobile device is connected to the local area network of the specific company:
      is a smart phone and includes a system application installed; or
      is a mobile phone and has a capability of connecting to a system web page server;
   a controller containing a software, a central processing unit, a random-access memory, a storage and ethernet adapter with Internet, a database, and a system security key, the controller is operatively connected to the wi-fi area network and to the personal mobile device;
   wherein the software recognizes a unique identifier of the personal mobile device as soon as the personal mobile device is connected to the local area network;
   wherein the software includes a program that manages waiting time at all check-out points of the specific company;
   wherein when the user is ready to check out, the user presses a check-out button on the application, or the system webpage and the program informs the user of estimated waiting time of the next available check-out device;
   the program sends a notification to the user when it is time to proceed to the check-out device and provides the location of the check-out device.

2. A method for management and optimization of waiting time for check-out services, the method comprising the steps of:
   establishing a local wi-fi area network dedicated to a specific company;
   a personal mobile device connected to the local area network of the specific company, the personal mobile device;
      is a smart phone and includes a system application installed;
   establishing a controller containing a software, central processing unit, a random-access memory, a storage and ethernet adapter with Internet, a database, and a system security key, the controller is operatively connected to the wi-fi area network and to the personal mobile device;
wherein the software recognizes a unique identifier (MAC address) of the personal mobile device as soon as the personal mobile device is connected to the local area network;
wherein the software includes a program that manages waiting time at all check-out points of the specific company;
wherein when the user is ready to check out, the user presses a check-out button on the application, or the system webpage and the program informs the user of estimated waiting time of the next available check-out device;
the program sends a notification to the user when it is time to proceed to the check-out device and provides the location of the check-out device.

* * * * *